US007738532B2

United States Patent
Cheng et al.

(10) Patent No.: US 7,738,532 B2
(45) Date of Patent: Jun. 15, 2010

(54) METHOD AND APPARATUS OF CHANNEL ESTIMATION IN AN INTRA-FREQUENCY CELL

(75) Inventors: Jian Cheng, Shanghai (CN); Liyun Luo, Shanghai (CN)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 950 days.

(21) Appl. No.: 11/518,395

(22) Filed: Sep. 8, 2006

(65) Prior Publication Data

US 2007/0058697 A1  Mar. 15, 2007

(30) Foreign Application Priority Data

Sep. 9, 2005  (CN)  ............ 2005 1 0029535

(51) Int. Cl.
  *H04B 1/69* (2006.01)
  *H04B 7/216* (2006.01)
(52) U.S. Cl. .................. 375/144; 370/342
(58) Field of Classification Search ........ 375/130, 375/140, 148, 147, 149, 144, 141, 145; 370/335, 370/342, 441
See application file for complete search history.

(56) References Cited

U.S. PATENT DOCUMENTS

| 6,961,365 | B2* | 11/2005 | Li et al. .............. 375/148 |
| 7,489,732 | B2* | 2/2009 | Cheng ................. 375/260 |
| 2005/0286613 | A1* | 12/2005 | Wang et al. ............ 375/148 |
| 2006/0280273 | A1* | 12/2006 | Mueller-Weinfurtner .... 375/368 |
| 2008/0123611 | A1* | 5/2008 | Wang et al. ............ 370/342 |
| 2008/0229367 | A1* | 9/2008 | Cheng et al. ........... 725/62 |

* cited by examiner

*Primary Examiner*—Tesfaldet Bocure (57) ABSTRACT

This invention discloses a channel estimation method for partial IC in TD-SCDMA intra-frequency cell, Specifically IC or de-correlation multi-user detection is utilized. Partial IC is implemented to realize the joint detection of the channel in several intra-frequency cells. As to n cells, the detailed procedures go as follows:

At first, n 2×128 memories are established, just as $s_1$, $s_2$, $s_3 \ldots s_n$, in order to store the complex serial. Midamble codes of the received signal constitute the 128-chip data. Step 1: The data taken from Midamble codes of the received signals undergo the Partial IC process of the residual past in the first cell. The process of channel estimation in the first cell is undertaken. Afterwards, the received signals of UE from the $1^{st}$ cell are recovered. The channel of the other cells is estimated from the received signals and the received signals of corresponding Midamble code is recovered to repeat the above procedures, until the completion of the process of the received signal, and it comes to Step (n+1). Iteration once is finished from Step 1 to Step (n+1), in which n processes are involved and one process is correspondent to one cell. The iteration after m times will finalize the channel estimation.

7 Claims, 7 Drawing Sheets

Figure 12

METHOD AND APPARATUS OF CHANNEL ESTIMATION IN AN INTRA-FREQUENCY CELL

CROSS-REFERENCE TO RELATED APPLICATION

This application is related to Chinese Patent Application No. 200510029535.2, filed Sep. 9, 2005, the disclosure of which is incorporated herein by reference in its entirety.

BACKGROUND

This invention relates to channel estimation in an intra-frequency cell, more specifically, the method and apparatus of channel estimation concerning partial interference cancellation in a TD-SCDMA intra-frequency cell.

FIELD OF THE INVENTION

TD-SCDMA system can be an intra-frequency network, or inter-frequency network. The advantages of the intra-frequency network are that all the cells can utilize all the present frequency resources to the extent, and have the highest frequency spectrum utilization rate.

In an intra-frequency network, the multi-path inside the cell is realized by code division multiple access (CDMA); the recognition of the cells is realized by Basic Midamble Code (BMC) and Chip-level Scramble Code (CSC). TD-SCDMA system has 128 BMC resources and their 128 corresponding CSC resources. BMC is channel training sequence, used for channel estimation, while CSC is to scramble the transmission code symbols, so that the transmission symbols are close to White Gaussian Noise.

Among 128 BMC resources, different BMCs are utilized in the adjacent cells, while BMC code number is broadcasted in the present cell and the adjacent cell.

The inter-relativity of BMC channel training is not very good. At the boundary of the intra-frequency network, UE receiver can independently estimate the channel by the received signals from several adjacent cells. The estimated channel response from such estimation method will generate interference. At worst, the consequent channel window activation is wrongly-detected, and joint cell detection of UE receiver fails.

Interference Cancellation (IC), an important branch of multi-user detection, has been a hot topic since the beginning of 1990 and produced lots of research results. The problem is how to introduce IC technology into a realistic system. IC can be categorized by the following terms such as Parallel IC, Serial IC, Iterative IC, Partial IC, etc.

If TD system is intra-frequency network, the cell recognition is realized by SYNC_DL (downlink synchronization code) in DwPTS and BMCs. The users of different cells are recognized by scramble codes and BMCs. Little has been done on the topic of how to make joint channel estimation in TD intra-frequency network to restrict the intra-frequency interference.

BRIEF DESCRIPTION OF THE DRAWINGS

The above-mentioned and the other features in this invention are better exemplified with the embodiments depicted in the figures, in which the figure notes will represent the same characteristics.

DETAILED DESCRIPTION

This invention is further exemplified with the use of the figures and the embodiments.

The Embodiment of Estimation to the Three Cells

Figure 1:
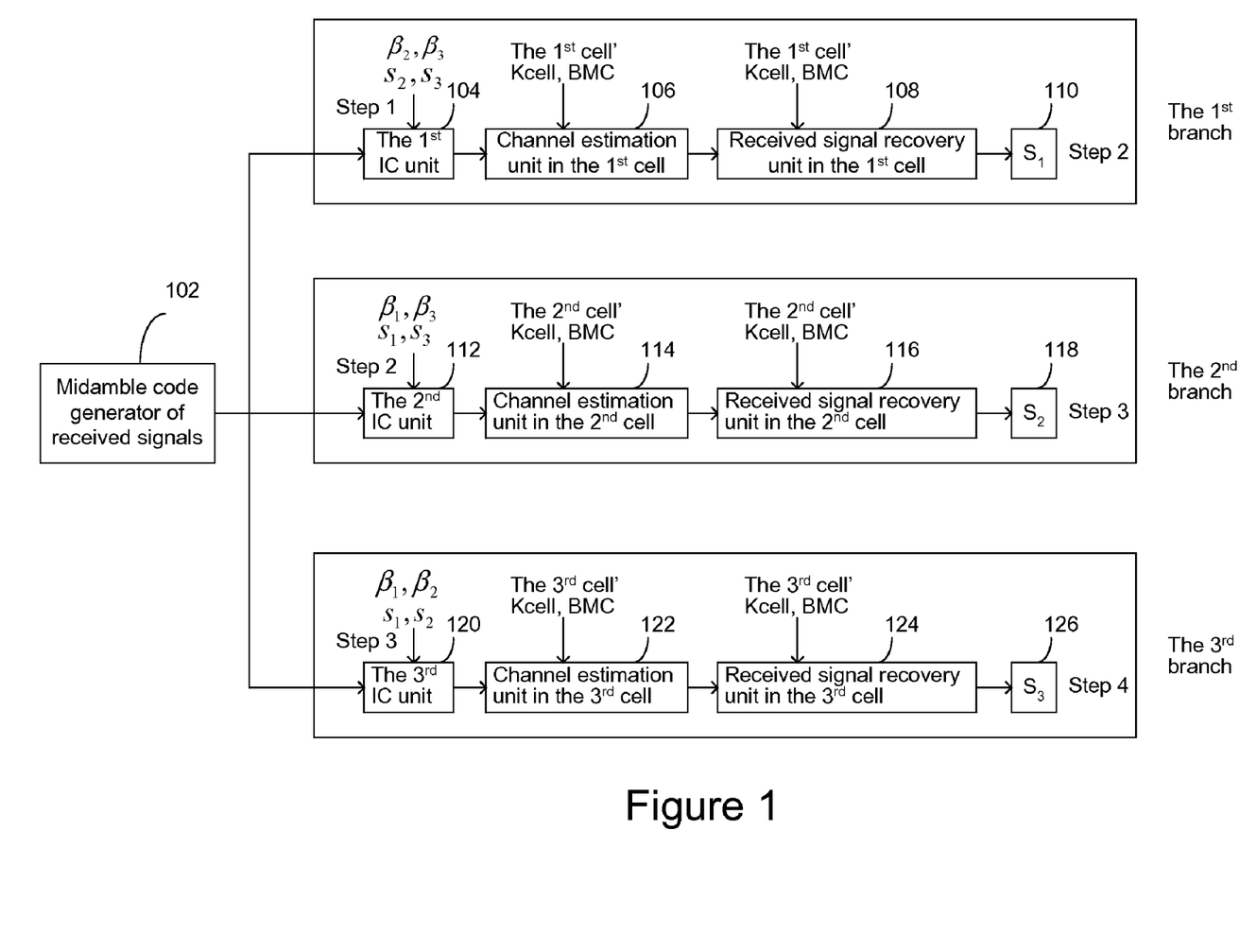
FIG. 1 is a structural view of a channel estimation apparatus concerning three cells according to an embodiment of the present invention.

Referring to FIG. 1, there are 3 (2×128) memories 110, 118 and 126, to respectively restore 1×128 complex serial, that is, the received signals $s_1$, $s_2$ and $s_3$, whose original value is 0.

The Midamble code generator 102 of the received signals, is to take the channel training serial out and combine it into 128-code.

Concerning 3 different cells, different cell has an independent branch to proceed, and each branch including the following parts works according to the following procedures:

First, the $1^{st}$ branch is taken into consideration. In Step 1, Midamble codes obtained from the Midamble code generator 102 of the received signals are sent to the first IC unit 104 so that the Partial IC is undertaken towards the interference cell signal. As to the details, FIG. 4 will explain more. The data after the interference cell will be sent from IC unit 104 of the first part to channel estimation unit 106 of the $1^{st}$ cell to undertake the channel estimation of channel estimation in the present cell (that is, the $1^{st}$ cell), as further depicted in the later part of this invention. The channel response, estimated by the channel estimation unit 106 in the $1^{st}$ cell, together with BMCs and system codes Kcell, is sent to recovery unit 108 of received signals in the $1^{st}$ cell. The detailed recovery process is exemplified in FIG. 5. The recovery unit 108 of received signal in the $1^{st}$ cell restores the signal $s_i$ received from the $1^{st}$ cell by UE, and refreshes the memory 110 of $s_i$. Now it comes to Step 2. Apparatuses 104 to 110 make up the $1^{st}$ branch.

Step 2 is similar to Step 1, in which the $2^{nd}$ IC unit 112 of the $2^{nd}$ branch, channel estimation 114 of the $2^{nd}$ cell, and recovery unit 116 of received signals of the $2^{nd}$ cell, handle the signal $s_2$, and refresh memory 118 of $s_2$. Apparatuses 112 to 118 make up the $2^{nd}$ branch.

Step 3, is similar to Step 2, in which the $3^{rd}$ IC unit 120 of the $3^{rd}$ branch, channel estimation unit 122 of the $3^{rd}$ cell, and recovery unit 124 of the $3^{rd}$ cell handle the signal $s_3$, and refresh memory 126. Apparatuses 120 to 126 make up the $3^{rd}$ branch. Now it comes to Step 4.

The procedures from Step 1 to Step 4 finish one iteration. That is, one iteration involves the above mentioned 3 branches. M iteration finalizes the channel estimation. Usually the value of m is set to be 3-5.

Take the $1^{st}$ branch for an example, the details of the IC unit 104 of the $1^{st}$ cell. 112 and 120 have the same structure as 104.

Figure 3:
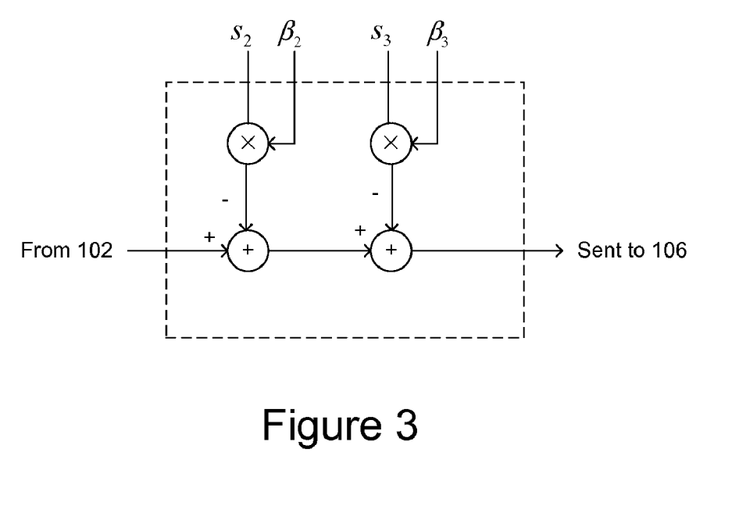
FIG. 3 is a structural view of an interference cancellation unit of the channel estimation apparatus c according to the embodiment of the present invention.

IC unit 104 in the first cell as depicted by FIG. 3 is to subtract interference signals from Midamble code of received signal transmitted from Midamble code generator 102. The way of subtraction is to multiply Partial IC coefficient β different cells by the signals in this cell and store the present value in the corresponding memory. The Partial IC coefficient β satisfies $0 \leq \beta_i \leq 1$, i=1, 2, 3. These coefficients will change with the branch and iteration time. After simulation, the value of β is depicted in Chart 1, when the iteration m is 4, and there are 3 intra-frequency networks. Therefore, the basic rule is that the recovery of interference signal is more and more accurate with the increase of the iteration time. Therefore, these interference signals can be cancelled to the extent from the overall received signals. That is, the values of $\beta_1$, $\beta_2$, $\beta_3$ can be bigger and bigger. At the same time, at the $i^{th}$ branch, $\beta_i$ is forever 0. That is, when channel estimation of the $i^{th}$ cell is under way, the restored received signal $s_i$ can't be cancelled from the overall received signals.

CHART 1

One example of the coefficient β in the Partial IC

| | BRANCH | | |
|---|---|---|---|
| TIME | 1 | 2 | 3 |
| | ITERATION [$\beta_1$, $\beta_2$, $\beta_3$] | | |
| 1 | [0, 0, 0] | [0.2, 0, 0] | [0.2, 0.3, 0] |
| 2 | [0, 0.3, 0.4] | [0.6, 0, 0.4] | [0.6, 0.7, 0] |
| 3 | [0, 0.9, 0.9] | [0.9, 0, 0.9] | [0.9, 0.9, 0] |
| 4 | [0, 1, 1] | [1, 0, 1] | [1, 1, 0] |

Channel estimation unit (including channel estimation unit 106 of the $1^{st}$ cell, 114 of the $2^{nd}$ cell, 122 of the $3^{rd}$ cell) at the $i^{th}$ branch is further depicted in the following formula:

$$\vec{h}_i = IFFT\left(\frac{FFT(r'_i)}{FFT(bmc_i)}\right)$$

In this formula, $\vec{h}_i$ is the 128-taps channel impulse response estimated at the $i^{th}$ branch. FFT is Fast Fourier Transfer, IFFT is Inverse Fast Fourier Transfer, $r'_i$ is the received signal after IC in the $i^{th}$ cell, $bmc_i$ is the basic Midamble code in the $i^{th}$ cell, that is, $bmc_i$=BWC×W, in which W=$j^{[1, 2, \ldots, 128]}$=[j, −1, −j, 1, . . . , j, −1, −j, 1] and j is imaginary number.

Figure 4:
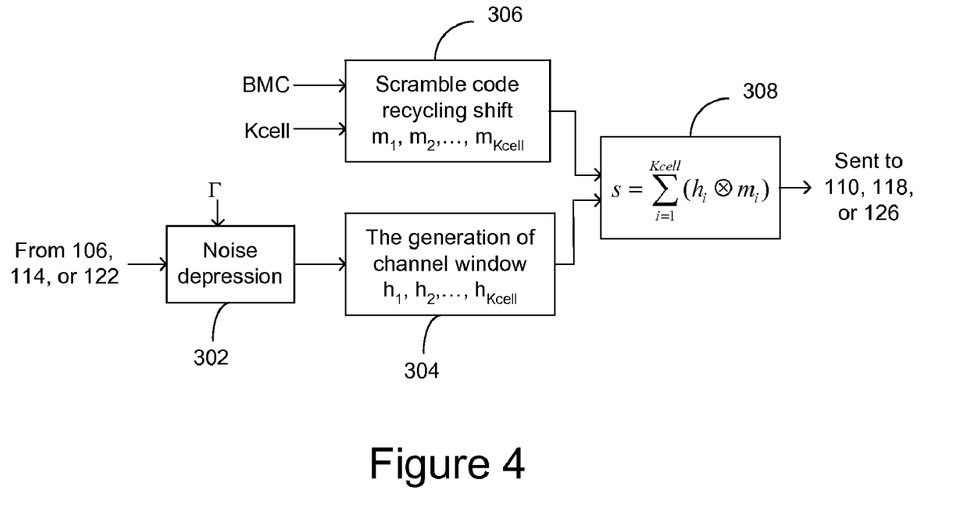
FIG. 4 is a structural view of a channel recovery unit according to the embodiment of the present invention.

Take the $1^{st}$ branch for an example: the $1^{st}$ recovery unit 108 of received signals can be extended to what is represented in FIG. 4.

Figure 5:
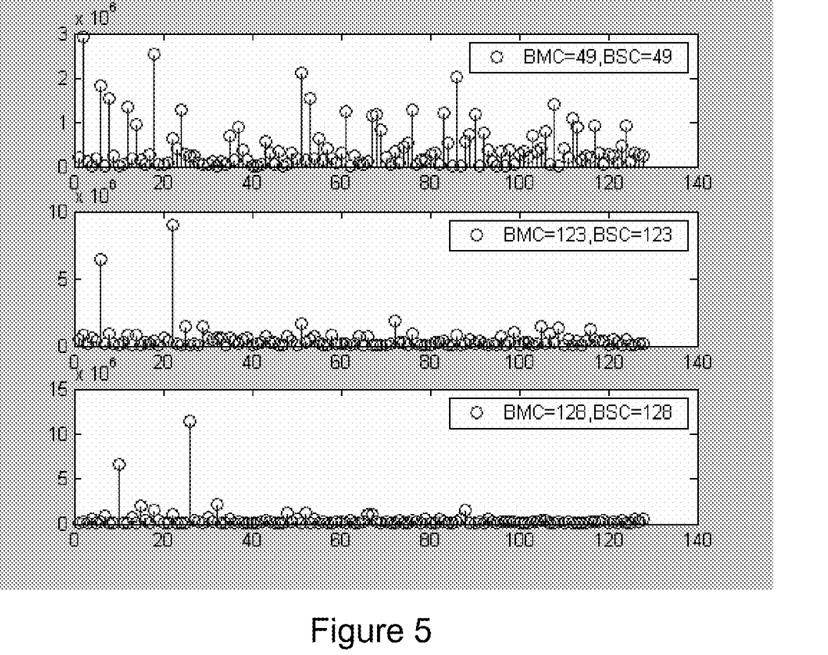
FIG. 5 is a simulation result of the channel estimation concerning 3 cells according to the first case of the embodiment of the present invention.

FIG. 5 is the extension of the signal recovery unit (108, 116 or 124) in FIG. 1. Channel noise depression unit 302 is to depress the noise of channel impulse response from unit 106, 114, and 122. Suppose $h_1$, $h_2$, . . . , $h_{128}$ is the channel estimation from unit 106, 114 and 122, then the following procedures take place:

Step 1: Channel tap power $P_i=|h_i|^2$, i=1, 2, . . . , 128 is calculated;

Step 2: Threshold is set. Γ is the pre-set relative threshold, and absolute threshold $\gamma=\max(P_1, P_2, \ldots, P_{128}) \times \Gamma$ Step 3: Let $P_i$, i=1, 2, . . . , 128 be compared with threshold γ. If $P_i$ is bigger than γ, its corresponding $h_i$ can be retained, otherwise, it is 0.

In the above mentioned steps, the relative threshold Γ, used for the channel noise depression, is set to be (0,1), and will decrease with the multiply of the iteration. That is, with the increase of iteration, channel estimation is more and more accurate, so the noise depression threshold can be adapted to a lower value. For example, in regards to simulation, the value of Γ is set to be $$\left[\frac{2}{3} \quad \frac{1}{2} \quad \frac{1}{4} \quad \frac{1}{8}\right],$$

in correspondent to the $1^{st}$, $2^{nd}$, $3^{rd}$, and $4^{th}$ iteration. If there are only 3 iteration, the value of Γ can be put to the first three values.

According to TD work mode, (e.g. COMMON mode, DEFAULT mode, and SPECIFIC mode), the value of system parameters (Kcell) can be set to be any even number from 1 to 16, but usually it is 8. Training code recycling shift unit 306 and channel generator 304 can be referred in 3GPP TS25.221, and thus no further exemplification will be done in this aspect.

The finalized signal recovery is depicted in signal recovery unit 308 and will be restored in regards to the formula $$s = \sum_{i=1}^{Kcell} (h_i \otimes m_i),$$

in which $\otimes$ represents convolution operation, the obtained restored signal refreshes the stored data in corresponding 110, 118 and 126.

Although the above mentioned embodiment refers to 3 cells, the person skilled in the art should bear in mind that this invention can apply to n cells.

The Embodiment of N Cells

Figure 2:
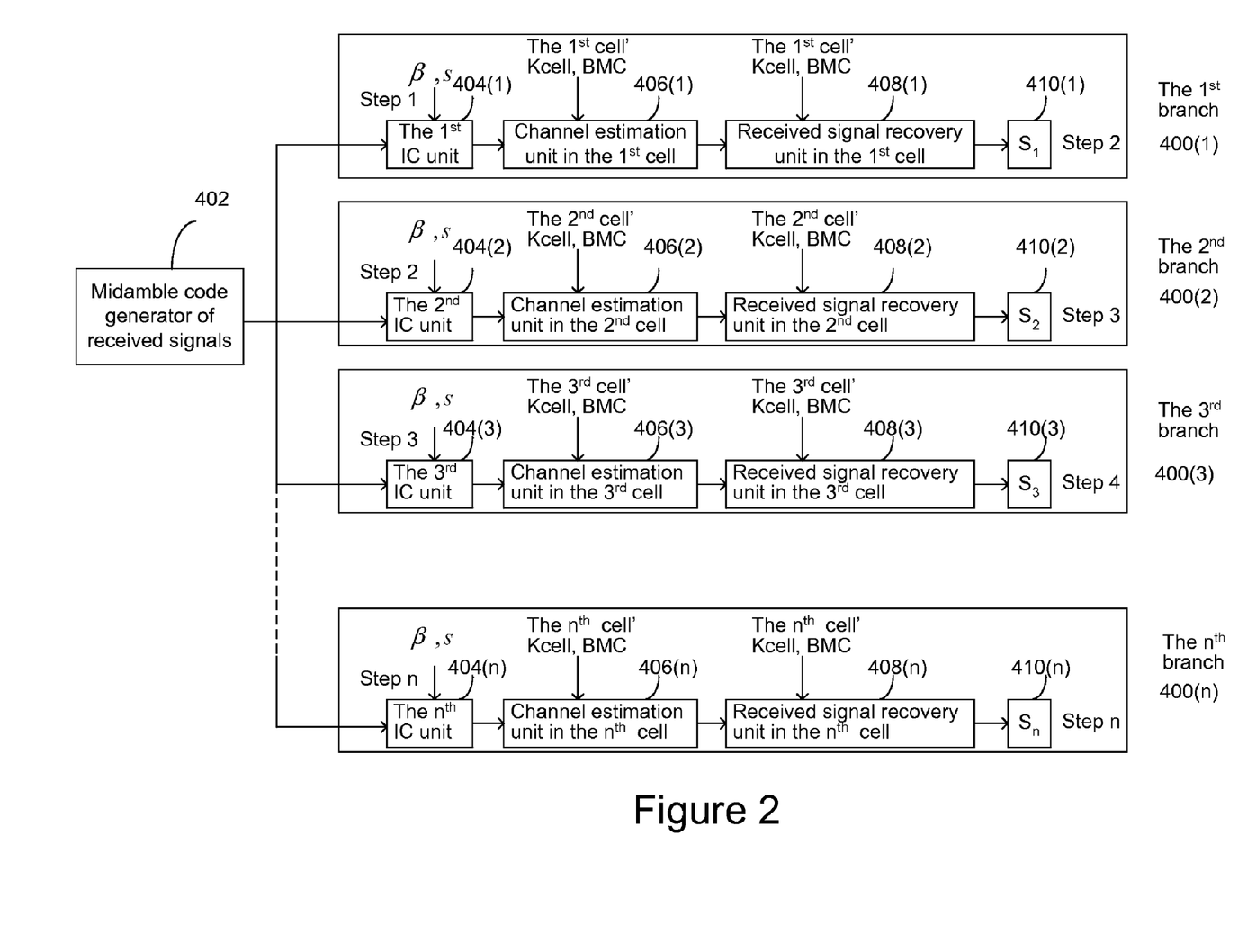
FIG. 2 is a structural view of a channel estimation apparatus concerning n cells according to the embodiment of the present invention.

The channel estimation apparatus of Partial IC in TD-SCDMA intra-frequency network concerning n cells involves those represented in FIG. 2:

There are n (2×128) memories 410(1) . . . 410(n), to respectively restore 1×128 complex serial, that is, the received signals $s_1$, $s_2$, $s_3$ . . . $s_n$, whose original value is 0.

The Midamble code generator 402 of the received signals, is to take the channel training serial out and combine it into 128-code.

The 1$^{st}$ branch 400(1) handles the received signal $s_1$, in the following way:

The Partial IC unit 404(1) in the 1$^{st}$ cell receives the Midamble code generated by Midamble code generator, and undergoes the process of the partial IC of the signal in the 1$^{st}$ cell.

The channel estimation unit 406(1) in the 1$^{st}$ cell receives the data from the Partial IC, output by Partial IC 404(1) in the 1$^{st}$ cell, and undergoes the channel estimation in the 1$^{st}$ cell.

The recovery unit 408(1) in the 1$^{st}$ cell receives the channel response estimated from channel estimation apparatus 406 (1) in the 1$^{st}$ cell, and then refreshes memory 410(1) of $s_1$, based on BMCs in the 1$^{st}$ cell and received signal $s_1$ of UE in the first cell, restored by system parameters in the 1$^{st}$ cell.

The 2$^{nd}$ branch 400(2) handles received signal $s_2$ in the 2$^{nd}$ cell. The herein said 2$^{nd}$ branch has the same structure as that in the 1$^{st}$ branch, and starts working after the 1$^{st}$ branch ceases to work.

The 3$^{rd}$ branch 400(3) handles received signal $s_2$ in the 3$^{rd}$ cell. The herein said 3$^{rd}$ branch has the same structure as that in the 1$^{st}$ branch, and starts working after the 1$^{st}$ branch ceases to work.

The channel estimation apparatus of Partial IC in TC-SCDMA intra-frequency cell involves n branches, to respectively deal with the received signal $s_n$ in the n$^{th}$ cell. All the n branches will start working after the previous branch ceases to work.

After all the branches work, one iteration is finished. That is to say, one iteration involves n branches, and each branch is correspondent to one cell, and m iteration will finalize channel estimation s.

According to the embodiments of n cells, IC unit used for the process of the i$^{th}$ part from the i$^{th}$ cell, detracts the interference cell signal, that is, from $s_1$ to $s_{i-1}$, and from $s_{i+1}$ to $s_n$, from the received signal, At the same time, Partial IC coefficient $\beta_1$ to $\beta_{i-1}$ and $\beta_{i+1}$ to $\beta_n$ which is relative to interference cell, is introduced. $\beta_i$ satisfies $0 \leq \beta_i \leq 1$, $i=1 \ldots n$; the value of $\beta_i$ increases with the iteration time m. As to the i$^{th}$ cell being processed, $\beta_i$ is forever set to be 0.

As to the embodiments of n cells, the recovery unit of received signals in the i$^{th}$ cell goes as follows:

$$\vec{h}_i = IFFT\left(\frac{FFT(r'_i)}{FFT(bmc_i)}\right)$$

$\vec{h}_i$ is 128-taps-channel impulse response estimated in the i$^{th}$ cell, FFT is Fast Fourier Transfer, IFFT is Inverse Fast Fourier Transfer, $r'_i$ is the received signal after IC in the i$^{th}$ cell, $bmc_i$ is the basic Midamble code in the i$^{th}$ cell, that is, $bmc_i$=BWC×W, in which W=$j^{[1, 2, \ldots, 128]}$=[j, −1, −j, 1, ..., j, −1, −j, 1] and j is imaginary number.

According to an embodiment of the present invention, the received signal recovery in the i$^{th}$ cell goes as follows:

The obtained channel response will undergo the process of noise depression. Suppose $h_1$, $h_2$, ..., $h_{128}$, is the output channel estimation, there are the following steps:

Step 1: Channel tap power is calculated, $P_i=|h_i|^2$, i=1, 2, ..., 128

Step 2: Threshold is set. $\Gamma$ is the pre-set relative threshold, and absolute threshold $\gamma=\max(P_1, P_2, \ldots, P_{128})\times\Gamma$ Step 3: Let $P_i$, i=1, 2, ..., 128 be compared with threshold $\gamma$. If $P_i$ is bigger than $\gamma$, its corresponding $h_i$ can be retained, otherwise, it is 0.

In the above mentioned steps, the relative threshold $\Gamma$, used for the channel noise depression, is set to be (0,1), and will decrease with the multiply of the iteration.

The signals after the noise depression will generate channel window.

BMCs and system parameters are received to undergo the process of Midamble code recycling shift.

Finally, the signal is restored as directed by the formula $$s = \sum_{i=1}^{Kcell} (h_i \otimes m_i).$$

According to an embodiment of the present invention, the iteration time m is 4 and in the channel noise depression, the relative threshold $\Gamma$ is $$\left[\frac{2}{3} \quad \frac{1}{2} \quad \frac{1}{4} \quad \frac{1}{8}\right],$$

corresponding to the 1$^{st}$, 2$^{nd}$, 3$^{rd}$ and 4$^{th}$ iteration.

Iteration time standard goes as follows:

According to an embodiment of the present invention, the iteration time is 3 in AWGN, slow multi-path fading wireless circumstances, while the iteration time is 4 in fast multi-path fading and wireless circumstances. For the sake of consolidation, iteration time m is set to be 4.

According to an embodiment of the present invention, the system parameter of the cell is an even number, and resolved from the broadcast channel.

The Embodiments of Channel Estimation Methods in N Cells

This invention provides with channel estimation methods of Partial IC in TD-SCDMA intra-frequency cell. Partial IC is used to realize the joint channel estimation of several intra-frequency cells. As to n cells, the detailed procedures go as follows:

At first, n 2×128 memories are established, just as $s_1$, $s_2$, $s_3 \ldots s_n$, in order to store the corresponding 2×128 complex serial. The original value of $s_1$, $s_2$, $s_3 \ldots s_n$ is all set to be 0.

The channel training serial of the receiving signal is taken out and makes up 128-chip data.

Step 1: The data taken from Midamble codes of the received signals undergo the Partial IC process of the residual past in the first cell. The data after Partial IC will undergo the process of channel estimation in the first cell. Channel response, BMCs and system parameters in the first cell will undergo the process of restoring the received signals. $S_1$, the received signal from the first cell of the terminal user, will see its memory refreshed and now it is comes to Step 2;

Step 2: The same process as that in Step 1 will be repeated in regards to received signals and channel estimation and the recovery of the received signals in the 2$^{nd}$ cell will be completed. Now it comes to Step 3;

Step 3: The same process as that in Step 2 will be repeated in regards to received signals and get channel estimation and the recovery of the received signals in the 3$^{rd}$ cell will be completed. Now it comes to Step 4;

The same process as that in Step (n−1) will be repeated in regards to received signals and channel estimation and the recovery of the received signals in the $n^{th}$ cell will be completed. Now it comes to Step (n+1);

One iteration is finished from Step 1 to Step (n+1), in which n processes are involved and one process is correspondent to one cell.

The iteration after m times will finalize the channel estimation.

In the above mentioned methods, the data from Midamble code of received signals execute the process of Partial IC in the $i^{th}$ cell, and then subtract the signals from interference cell, that is, from $s_1$ to $s_{i-1}$ to $s_{+1}$, and $s_{i+1}$ to $s_n$, At the same time, Partial IC coefficient from $\beta_1$ to $\beta_{i-1}$, and from $\beta_{i+1}$ to $\beta_n$. $\beta_i$ satisfies $0 \leq \beta_i \leq 1$, i=1 ... n; $\beta_i$ increases with iteration time m. As to the $i^{th}$ cell being processed, $\beta_i$ is 0.

In this method, the data after Partial IC in the $i^{th}$ cell is channel-estimated in the $i^{th}$ cell as follows:

$$\vec{h}_i = IFFT\left(\frac{FFT(r'_i)}{FFT(bmc_i)}\right)$$

$\vec{h}_i$ is 128-taps-channel impulse response estimated in the $i^{th}$ cell, FFT is Fast Fourier Transfer, IFFT is Inverse Fast Fourier Transfer, $r'_i$ is the received signal after IC in the $i^{th}$ cell, $bmc_i$ is the basic Midamble code in the $i^{th}$ cell, that is, $bmc_i$=BWC×W, in which W=$j^{[1, 2, \ldots, 128]}$=[j, −1, −j, 1, ..., j, −1, −j, 1] and j is imaginary number.

In this method, the received signal recovery process in the $i^{th}$ cell is represented in the following way:

The obtained channel response undergoes the process of noise depression. Suppose $h_1, h_2, \ldots, h_{128}$ is the output channel estimation, then:

Step 1: Channel tap power is calculated, $P_i = |h_i|^2$, i=1, 2, ..., 128

Step 2: Threshold is set. $\Gamma$ is the pre-set relative threshold, and absolute threshold $\gamma = \max(P_1, P_2, \ldots, P_{128}) \times \Gamma$ Step 3: Let $P_i$, i=1, 2, ..., 128 be compared with threshold $\gamma$. If $P_i$ is bigger than $\gamma$, its corresponding $h_i$ can be retained, otherwise, it is 0.

In the above mentioned steps, the relative threshold $\Gamma$, used for the channel noise depression, is set to be (0,1), and will decrease with the multiplication of the iteration.

Channel window is generated. The signals after the noise depression are received and channel window is thus generated;

Scramble code recycling shift: BMCs and system parameters are received and scramble recycling shift is under way;

Signal recovery: Signal is recovered in respect of the formula $$s = \sum_{i=1}^{Kcell}(h_i \otimes m_i).$$

In this method, the iteration time m is 4 and in the channel noise depression, the relative threshold $\Gamma$ is $$\left[\frac{2}{3} \quad \frac{1}{2} \quad \frac{1}{4} \quad \frac{1}{8}\right],$$

corresponding to the $1^{st}$, $2^{nd}$, $3^{rd}$ and $4^{th}$ iteration.

The iteration time m is set to be 3-5. The standard for setting the value of iteration time goes as follows: the iteration time is 3 in AWGN, slow multi-path fading wireless circumstances, while the iteration time is 4 in fast multi-path fading and wireless circumstances. For the sake of consolidation, iteration time m is set to be 4.

In this method, the system parameter of the cell is an even number between 1 and 16.

Simulation Result

Case 1:

Suppose that each cell is in the mode of DEFAULT, its Kcell is 8, and has activated 2 channel windows and 4 codes. Meanwhile, each cell is under AWGN wireless channel circumstances, and $I_{or}/I_{oc}$ of each cell is 5 dB and will be added by the same power. Compared to Cell 1 (BMC=49), Cell 2 (BMC=123), and Cell 3 (BMC=128) have 4 chip delay and 8 chip delay respectively; $\beta$ is the first 3 lines as shown in FIG. 1. Then three independent channel response and channel response after Partial IC of 3 iteration are respectively shown in FIGS. 5 and 8.

Figure 6:
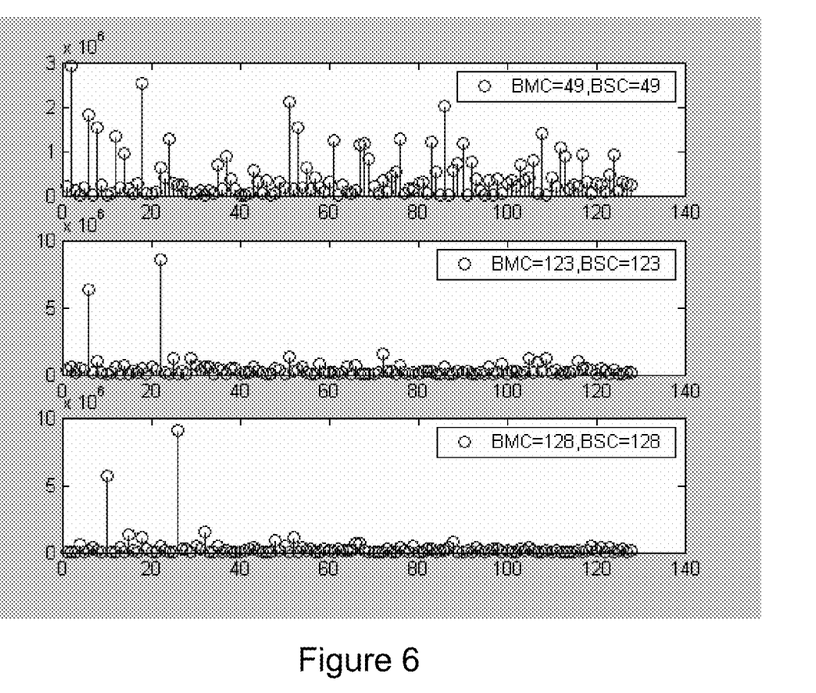
FIG. 6 is a simulation result of the first iteration of the channel estimation in partial interference cancellation according to the first case of the embodiment of the present invention.
Figure 7:
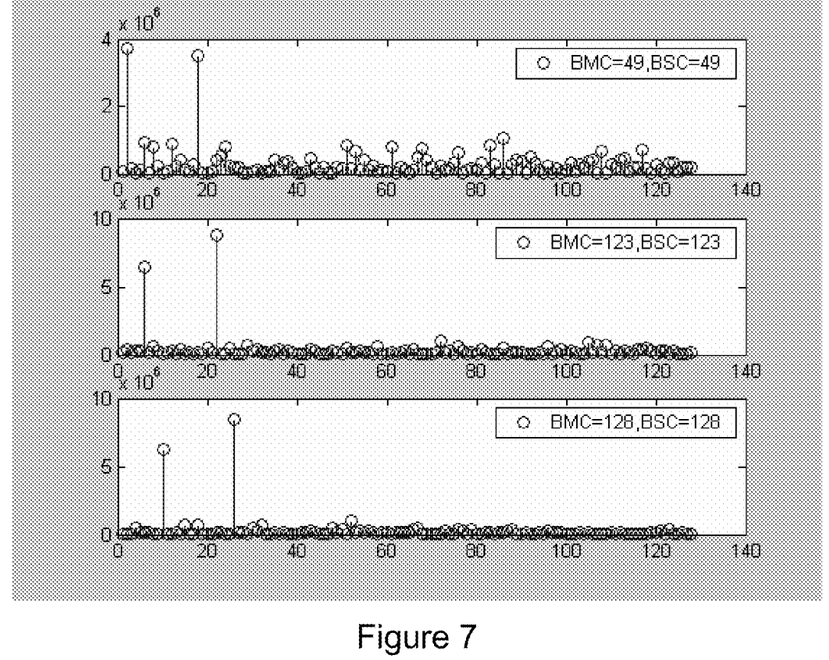
FIG. 7 is a simulation result of the second iteration of the channel estimation in partial interference cancellation according to the first case of the embodiment of the present invention.
Figure 8:
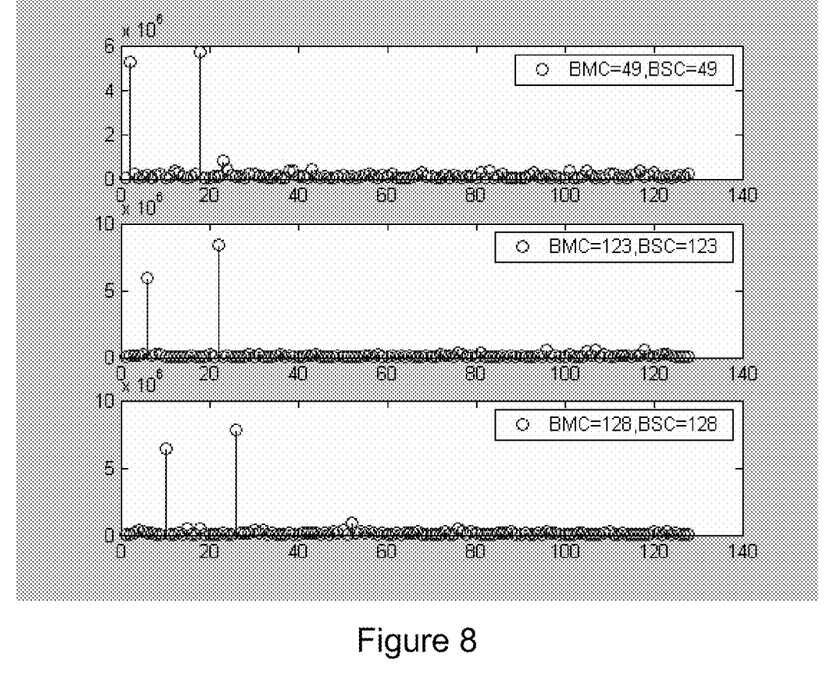
FIG. 8 is a simulation result of the third iteration of the channel estimation in partial interference cancellation according to the first case of the embodiment of the present invention.

FIG. 5 is channel estimation chart towards 3 cells; FIG. 6 is the first iteration of channel estimation in Partial IC; FIG. 7 is the $2^{nd}$ iteration of channel estimation in Partial IC; and FIG. 8 is the $3^{rd}$ iteration of channel estimation in Partial IC.

Case 2:

Suppose that each cell is in the mode of DEFAULT, its Kcell is 8, and has activated 2 channel windows and 4 codes. Meanwhile, each cell is under multi-path fading case 1 wireless channel circumstances (see 3GPP TS25.102), and $I_{or}/I_{oc}$ of each cell is 22.4 dB and will be added by the same power. $\beta$ is the first 3 lines as shown in FIG. 1. Then three independent channel response and channel response after Partial IC of 3 iteration are respectively shown in FIGS. 9, 10, 11 and 12.

Figure 9:
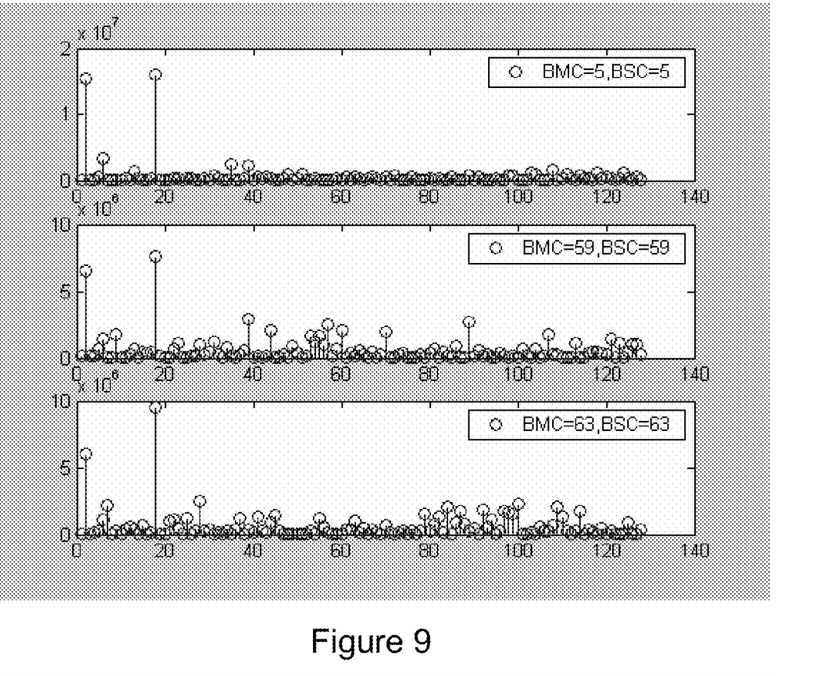
FIG. 9 is a simulation result of the channel estimation concerning 3 cells according to the second case of the embodiment of the present invention.
Figure 10:
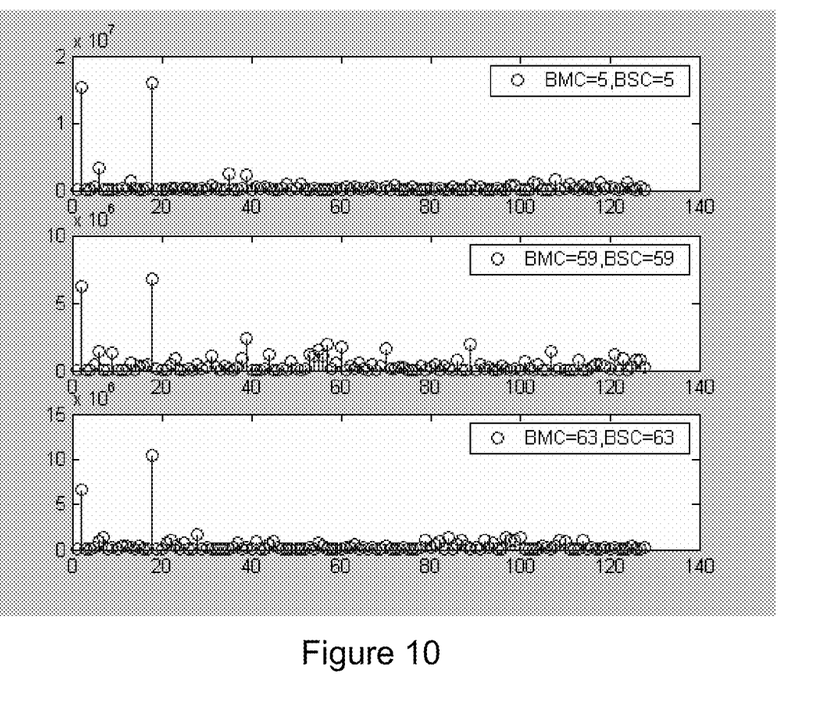
FIG. 10 is a simulation result of the first iteration of the channel estimation in partial interference cancellation according to the second case of the embodiment of the present invention.
Figure 11:
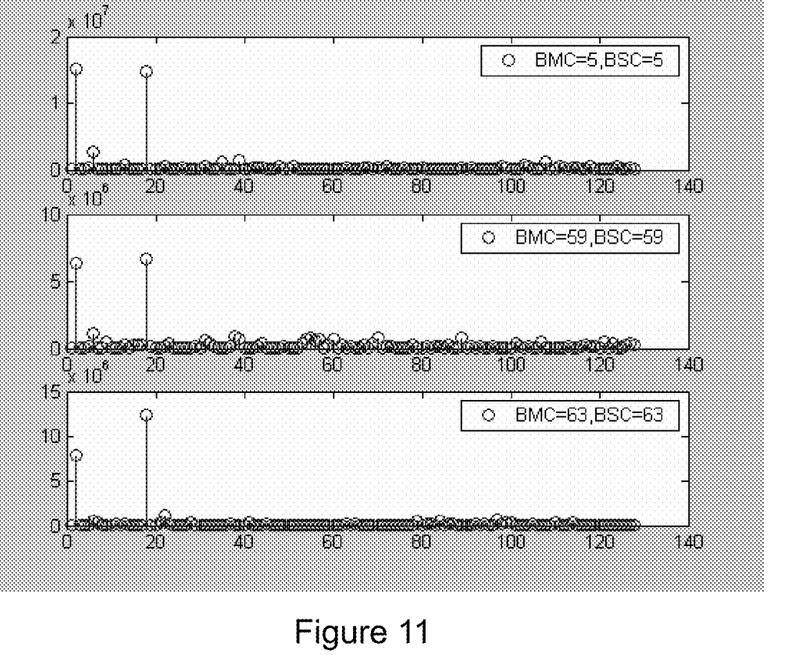
FIG. 11 is a simulation result of the second iteration of the channel estimation in partial interference cancellation according to the second case of the embodiment of the present invention.
Figure 12:
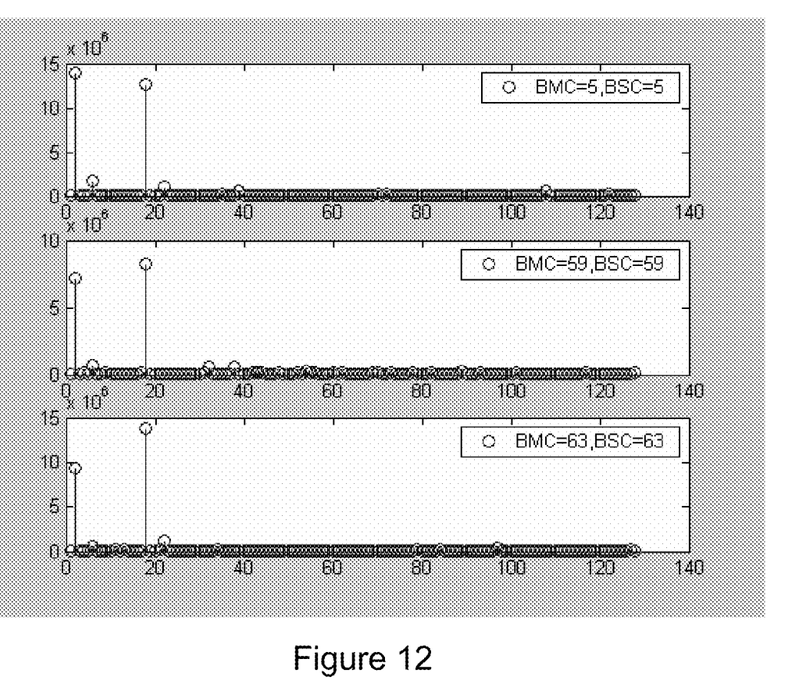
FIG. 12 is a simulation result of the third iteration of the channel estimation in partial interference cancellation according to the second case of the embodiment of the present invention.

FIG. 9 is channel estimation chart towards 3 cells; FIG. 10 is the first iteration of channel estimation in Partial IC; FIG. 11 is the $2^{nd}$ iteration of channel estimation in Partial IC; and FIG. 12 is the $3^{rd}$ iteration of channel estimation in Partial IC.

The two cases of simulation ensure the effectiveness of the techniques in this invention. From the point of complexity, if independent channel estimation is executed within 3 cells, from the above formula, each channel estimation needs two FFT (one IFFT is equal to the complexity of one IFFT). FFT of Midamble code can be set in advance and stored in memory, so the complexity of FFT is not calculated herein. Therefore, the independent channel estimation requires 6 (3×2) 128-taps FFT. However, if n iteration IC is implemented in this invention, 18(3×3×2) 128-taps FFT is required.

According to simulation, under AWGN, slow multi-path fading case 1 and case 2 wireless circumstances, iteration time is set to be 3, while under fast multi-path fading case 3 wireless circumstances, the best iteration time should be set to 4, in regards to the complexity and performance.

When the embodiments are taken into account, the iteration time is set to be 3, which can generate satisfactory performances. This technique can't be considered as simply 3 iteration IC. In each iterative process, the signals estimated in the former process will be implemented in the IC process of the channel estimation of the next cell. For example, in the $1^{st}$ iterative process, so estimated after the $1^{st}$ branch will be immediately employed in the Partial IC module of the $2^{nd}$ branch, while the corresponding Partial IC coefficient accretes gradually. In all, the iteration time with the same value is not just 3.

Once this technique depicted in this invention is introduced, the receiver will not be sensible to the selection of code group, so that the search for the better code group and its IPR can be avoided. This technique can be used in the downlink of UE receiver, or the uplink Node B receiver. The former refers to the condition when UE is located at the boundary of several cells, and UE receives the downlink signals from several cells; the latter refers to the condition that NodeB receives not only the uplink signals from its local UE, but also those from the UE of the neighboring cells.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of channel estimation for partial interference cancellation (IC) in a TD-SCDMA intra-frequency cell for n cells, comprising:
   (1) establishing n 2*128 memories as $s_1, s_2, s_3 \ldots s_n$, in order to store a corresponding 2*128 complex serial;
   (2) removing the channel training serial from a receiving signal r to form a 128-chip data;
   (3) using the midamble codes of the received signal for the partial IC process of the residual past in the first cell;
   (4) repeating step (3) on further received signals for a second cell;
   (5) repeating step (3) on further received signal for a third cell; and
   (6) iterating step (3) to step (5) for m times to finalize the channel estimation, wherein m>1.

2. A method for channel estimation in a TD-SCDMA intra-frequency system having N number of networks (N is an integer greater than 1), comprising:
   (a) receiving a signal from the TD-SCDMA intra-frequency system, the signal including midamble codes having channel estimation data;
   (b) multiplying the channel estimation data in the received signal individually by a coefficient, $\beta(0 \leq \beta \leq 1)$ corresponding to individual N number of networks to derive an interference factor
   (c) subtracting the interference factor from the channel estimation data;
   (d) performing channel estimation using the channel estimation data for the one of the N number of networks; and
   (e) increasing the coefficient β; and
   (f) repeating steps (b), (c), (d) and (e) for M times to finalize channel estimation, wherein M>1.

3. The method for claim 2 wherein the coefficient, β for the one of the N number of networks is always zero.

4. The method for claim 2 wherein performing channel estimation includes performing a calculation according to the following formula:

$$\vec{h}_i = IFFT\left(\frac{FFT(r'_i)}{FFT(bmc_i)}\right)$$

wherein $h_i$ is the channel impulse response for network i, $r'_i$ is the signal with interference cancellation for network I, and $bmc_i$ is the basic midamble code for network i.

5. The method for claim 4, further comprising depressing noise of the calculated channel impulse response $h_i$.

6. The method for claim 4, further comprising:
   calculating a channel tap power for network I as $P_i=|h_i|^2$;
   comparing the calculated channel tap power to a preset threshold; and
   if the calculated channel tap power is greater than the preset threshold, the channel impulse response is retained; otherwise, the channel impulse response is set to zero.

7. The method for claim 2 wherein M is 3 in additive white Gaussian noise (AWGN), slow multi-path fading wireless networks, and wherein M is 4 in fast multi-path fading wireless networks.

* * * * *